United States Patent

Mehnert

[15] 3,681,486
[45] Aug. 1, 1972

[54] METHOD FOR THE PRODUCTION OF BOTTLES OR THE LIKE BY BLOW MOLDING

[72] Inventor: Gottfried Mehnert, Berlin-Mariendorf, Germany

[73] Assignee: Conduco A.G., Zug, Switzerland

[22] Filed: Aug. 4, 1969

[21] Appl. No.: 847,369

[30] Foreign Application Priority Data

Aug. 5, 1968 Germany ............. P 17 79 384.9

[52] U.S. Cl. ................ 264/89, 264/99, 425/305, 425/326, 425/387
[51] Int. Cl. ............................................. B29c 17/07
[58] Field of Search ....... 264/98, 99, 94, 89; 18/5 BE, 18/5 BQ, 5 BT; 425/305, 326, 387

[56] References Cited

UNITED STATES PATENTS

| | | | |
|---|---|---|---|
| 2,898,633 | 8/1959 | Burch | 264/99 |
| 2,978,745 | 4/1961 | Langecker | 264/99 |
| 3,032,809 | 5/1962 | Willard | 264/98 UX |
| 3,224,038 | 12/1965 | Budeshein | 264/98 X |
| 3,239,879 | 3/1966 | Resnick | 264/99 X |
| 3,287,482 | 11/1966 | Wnek et al. | 18/5 BT X |
| 3,429,002 | 2/1969 | Saffron | 18/5 BT |
| 3,470,582 | 10/1969 | Martin, Jr. | 264/98 X |
| 3,504,397 | 4/1970 | Langecker | 264/98 X |
| 3,548,044 | 12/1970 | Gallay | 264/98 X |

FOREIGN PATENTS OR APPLICATIONS

| | | | |
|---|---|---|---|
| 206,638 | 12/1959 | Austria | 18/5 BT |

*Primary Examiner*—Robert F. White
*Assistant Examiner*—J. H. Silbaugh
*Attorney*—Michael S. Striker

[57] ABSTRACT

The sections of an open-and-shut mold in a blow molding apparatus carry clamping elements which engage the parison during closing of the mold to form in the parison a constriction and to support the blank which is obtained on severing of the parison. The blowing mandrel thereupon expands the blank directly below the constriction so that the blank engages the jaws at the upper end of the mold before the blank is fully expanded in response to admission of gas through the mandrel. The mandrel can pivot the clamping elements away from engagement with the blank or the apparatus comprises separate motors which move the clamping elements in synchronism with movements of the mold sections. The clamping elements can move the blank away from the die of the extruder prior to or during closing of the mold.

8 Claims, 17 Drawing Figures

PATENTED AUG 1 1972  3,681,486
SHEET 1 OF 4

INVENTOR:
GOTTFRIED MEHNERT
BY
Michael P. Stocker
Attorney

INVENTOR:
GOTTFRIED MEHNERT
BY
Michael P. Hriber
Attorney

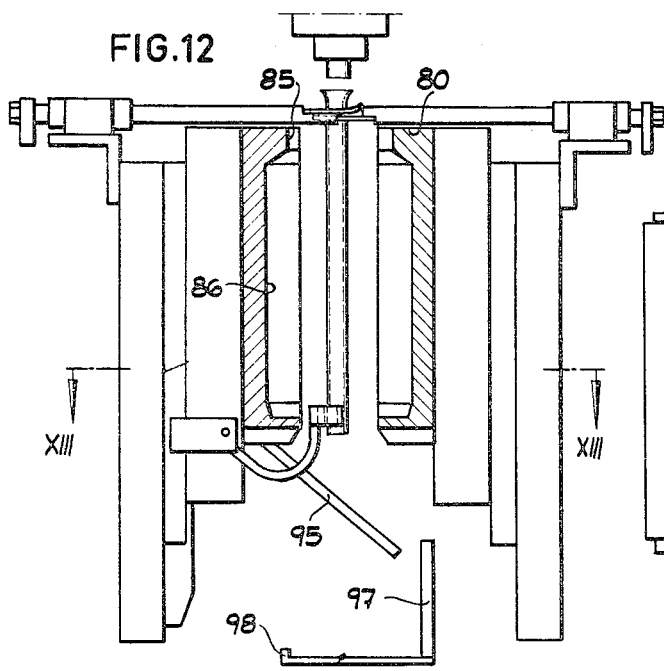
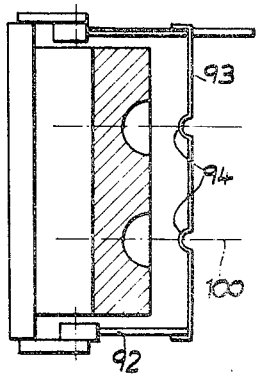

METHOD FOR THE PRODUCTION OF BOTTLES OR THE LIKE BY BLOW MOLDING

BACKGROUND OF THE INVENTION

The present invention relates to a method for the production of bottles or analogous hollow articles from synthetic thermoplastic material. More particularly, the invention relates to improvements in a method for the production of hollow articles by blow molding. Still more particularly, the invention relates to improvements in a blow molding method for the production of bottles or like hollow articles of the type having a neck or an analogous open-ended part which serves for admission or evacuation of flowable or particulate materials or commodities and/or for connection of the article to another article, a conduit or the like.

A blow molding apparatus normally comprises an extruder having one or more dies which discharge tubular parisons, one or more open-and-shut molds each having one or more cavities whose outline corresponds to the desired outline of an article, and a blowing mandrel which serves to admit into a parison compressed air or another gaseous blowing medium in order to expand the parison within the confines of the mold cavity. A severing device is normally provided to separate from the parison blanks which are thereupon expanded in response to admission of a blowing medium by way of the mandrel. As a rule, the extruder is moved relative to the mold, or vice versa, prior to admission of the blowing medium into a freshly formed tubular or bubble-like blank. The mandrel usually performs the additional function of cooperating with the adjoining portion of the closed mold to properly calibrate the open-ended part of a hollow article. Such calibration involves reducing the wall thickness of the blank, i.e., of that portion of the blank which is to form the neck of a bottle or an analogous open-ended part of a can, jar or similar container. This is desirable since the wall thickness of the remaining major part of the blank is also reduced in response to admission of a gaseous blowing medium.

An advantage of the just described blow molding method is that it allows for the production of smooth-surfaced hollow articles which are practically free of seams and whose open-ended parts are properly dimensioned from within and from without. In order to insure that the axial length of the open-ended part does not exceed a predetermined value, the blow molding apparatus for the production of plastic bottles or the like often comprises a further severing device which removes the surplus at the open end of such part to thus provide a smooth circular end face which can be properly sealed in response to the application of a cap or a like closing member.

The just described method can be employed for the production of plastic bottles or the like if the external diameter of the parison is less than the external diameter of the open-ended part on a finished bottle or the like and if the internal diameter of the parison is less than the diameter of the blowing mandrel. This is important in order to insure proper radial expansion of blanks against the mold and to insure that the internally calibrated open-ended part is formed with a smooth surface. Furthermore, the parison must be brought to a complete standstill (i.e., its lower end is not permitted to sway back and forth), and provision must be made to insure that the blank is held against undesired axial movement during introduction of the blowing mandrel. As a rule, conventional blow molding apparatus employs extruders which produce parisons with an external diameter which is only slightly less than the internal diameter of the neck portion of the mold cavity, and such extruders have dies which are provided with orifices for discharge of compressed gas serving to effect initial expansion of parisons into requisite engagement with the closed mold prior to severing of blanks and prior to introduction of the blowing mandrel. The thus admitted gas effects partial expansion of that part of the parison which is nearest to the die, i.e., which is more readily deformable than the leading end of the parison. The expansion is normally such that the blank which is obtained on severing of the parison includes a portion located above the mold and having a diameter which exceeds the diameter of the uppermost part of the mold cavity so that the blank cannot slip into the mold prior to or during introduction of the blowing mandrel. A drawback of such blow molding apparatus is that they require a complicated extruder and that the extruder must remain in accurate registry with the mold for a relatively long interval of time which is required to effect expansion of the blank at a level above the mold. Such intervals of idleness reduce the output of the apparatus; furthermore, an extruder whose die discharges air or another gas in order to bring about partial expansion of blanks at a level above the mold cannot be used in apparatus wherein the extruder is in continuous motion with reference to the mold or molds and/or vice versa. Additional problems arise when the external diameter of a parison is considerably less than the external diameter of the neck on a plastic bottle or the like because the expansion of blanks at a level above the mold then requires more time. In many instances, the radial expansion of such small-diameter parisons is insufficient to insure proper retention of blanks against axial movement, especially if the mold is movable with reference to the extruder so that the blank which is severed from the remainder of the parison must be held in a predetermined position during transport of the mold toward a blowing station where the mold cooperates with a blowing mandrel to complete the conversion of blanks into hollow articles.

SUMMARY OF THE INVENTION

It is an object of the present invention to provide a blow molding method for the production of plastic bottles or like open-ended articles according to which the blanks which are obtained upon severing of tubular parisons are manipulated in a novel and improved way.

Another object of the invention is to provide a blow molding method according to which the blanks are subjected to a preliminary expanding or widening action to insure proper retention in the mold irrespective of whether the mold is movable with reference to the extruder or vice versa and irrespective of the differences between the external diameter of a parison and the diameter of that portion of the mold cavity which receives the open-ended part of a hollow plastic article.

A further object of the invention is to provide a method for the production of bottles or the like from synthetic thermoplastic material in apparatus which can employ relatively simple extruders.

An additional object of the invention is to provide a method utilizing blow molding apparatus with novel and improved means for supporting tubular or bubble-shaped blanks of thermoplastic material in an optimum position for engagement with the blowing mandrel.

Still another object of the invention is to provide a blow molding method wherein the blanks are automatically stabilized in a novel and improved way to insure optimum positioning of such blanks prior, during and subsequent to closing of the mold.

An ancillary object of the invention is to provide a blow molding method wherein the die or dies of the extruder need not discharge air or other gases and wherein the mandrel cannot unduly displace a blank which extends into the cavity of the mold.

A concomitant object of the invention is to provide a method utilizing a novel blowing mandrel for use in a method of the above outlined character.

A further object of the invention is to provide a method wherein the mold of a blow molding apparatus is provided with novel parison-engaging and manipulating devices which occupy little room, which can be designed to engage and manipulate parisons of any desired practical diameter, and which cooperate with the blowing mandrel and with the severing means of the blow molding apparatus in a novel and improved way.

One feature of the invention resides in the provision of a method of blow molding in an open-and-shut mold bottles or analogous hollow articles of the type having an open-ended part (e.g., the neck of a bottle) of predetermined internal and external dimensions. The method comprises the steps of extruding thermoplastic material to form a hollow parison having an end, clamping the parison at a point which is remote from its end and is external to the mold to form in the parison a constriction, severing the parison at a point adjacent to the constriction and remote from the end of the parison to separate from the parison a hollow blank with a hollow end portion located at one side of the constriction and preferably resembling a funnel or chalice which diverges in a direction away from the constriction, radially expanding against the closed mold that intermediate portion of the blank which is adjacent to the constriction opposite the hollow end portion and constitutes the open-ended part of the finished article, and converting the blank into an article by blowing a gas through the hollow end portion and through the constriction so that the blank expands in the closed mold. The clamping action is preferably terminated prior to the converting step and the expanding step may include blowing a gas into the blank, preferably by admitting such gas through the customary axial hole of a blowing mandrel which calibrates the intermediate portion of the blank during conversion into a bottle or the like.

As a rule, the thermoplastic material is extruded downwardly so that the aforementioned end of the parison is its lower end. The clamping step preferably comprises deforming the parison radially inwardly at a point which is located at a requisite distance from the lower end of the parison to preferably provide the constriction with a narrow passage for admission of blowing gas. The converting step further includes severing the hollow end portion and a part of the expanded intermediate portion from the remainder of the blank, i.e., from the hollow article; such severing step is preferably performed by the blowing mandrel.

If the intermediate portion is to be expanded without admission of gas, the constriction is moved toward that portion of the mold which accommodates the open-ended part of the finished article whereby such shifting of the constriction effects at least some radial expansion of the intermediate portion.

The novel features which are considered as characteristic of the invention are set forth in particular in the appended claims.

The improved blow molding apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 12 is a similar elevational view but showing the mold of FIG. 11 in partly closed position;

FIG. 13 is a fragmentary horizontal sectional view as seen in the direction of arrows from the line XIII—XIII of FIG. 12; and FIG. 14 illustrates the structure of FIG. 11 or 12, with the mold shown in fully closed position.

DESCRIPTION OF THE PREFERRED EMBODIMENTS

Figure 1:
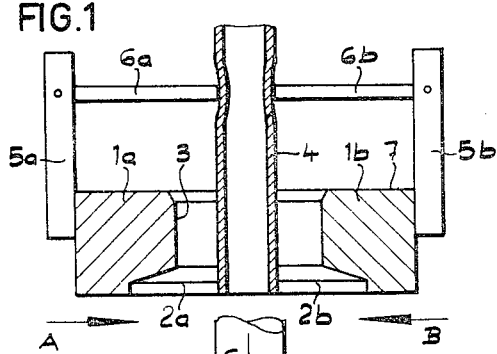
FIG. 1 is a schematic fragmentary central vertical sectional view of an open-and-shut mold in a blow molding apparatus which embodies one form of the invention, the mold being shown in open position and a clamping or parison-engaging device which is carried by the mold being in the process of forming the parison with a constriction.
Figure 5:
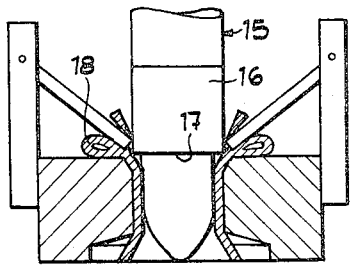
FIG. 5 illustrates the structure of FIG. 4 and shows the mandrel in a different position during calibration of the open-ended part of the article.
Figure 6:
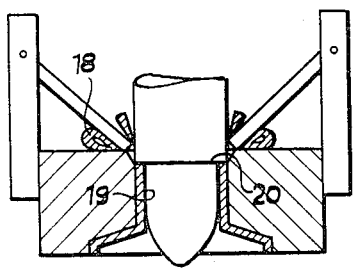
FIG. 6 illustrates the step of severing the surplus from the open-ended part.
Figure 7:
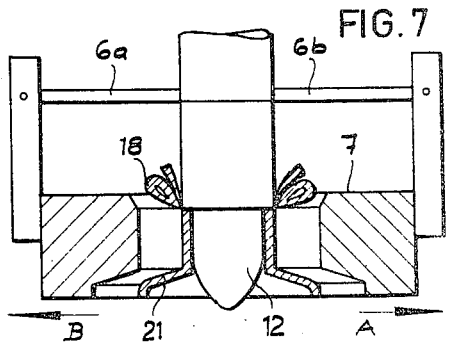
FIG. 7 illustrates the mold in open position with the freshly formed article suspended on the blowing mandrel.

Referring first to FIGS. 1 to 7, there is shown a portion of a blow molding apparatus which comprises an open-and-shut blow mold including two mirror symmetrical mold sections 1a, 1b which are movable from the open positions shown in FIGS. 1 and 7 toward the closed positions of FIGS. 2, 2a and 3–6. The blow molding apparatus is utilized for the production of hollow articles which consist of synthetic thermoplastic material, and more particularly for the production of hollow articles which are provided with material admitting or evacuating openings or with openings which permit connection of such articles with similar or otherwise configurated articles. The parisons which are to be converted into hollow plastic articles may be in the form of tubes, hoses or bubbles, i.e., they may be open at one or both ends. Since the blow molding apparatus are used preponderantly for the production of bottles, jars, cans or like containers which are open at one end, the following description will refer to bottles with the understanding, however, that this term is intended to embrace all such hollow articles which are provided with at least one opening for admission or evacuation of flowable or other materials or for connection to other components. That open-ended part of the container (bottle) which is formed with an opening will be referred to as the neck.

The mold sections 1a, 1b are provided with mirror symmetrical recesses 2a, 2b which form a mold cavity when the mold is closed. The surfaces surrounding the cavity in the closed mold determine the external configuration of the bottle. The mold sections 1a, 1b further include specially configurated calibrating or neck forming portions or jaws 3 serving to receive that intermediate portion of a blank which is to form the open-ended part or neck of the finished bottle.

The extruder of the blow molding apparatus includes a customary nozzle (not shown) which produces a continuous parison 4 of synthetic thermoplastic material. The parison 4 is extruded directly into the space between the sections 1a, 1b of the open mold, and the extruder is normally movable with reference to the mold or vice versa to locate the freshly extruded leading portion of the parison midway between the sections 1a, 1b. The length of the freshly extruded portion of the parison roughly corresponds to the desired length of a tubular blank 10 (FIG. 2) which is to be converted into a bottle 21 (FIG. 7).

Figure 2:
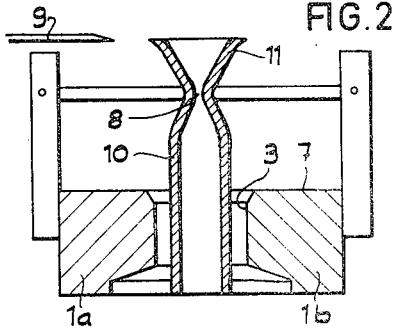
FIG. 2 illustrates the mold of FIG. 1 in closed position upon completed formation of a constriction in the parison and subsequent to severing of a blank from the parison.
Figure 2A:
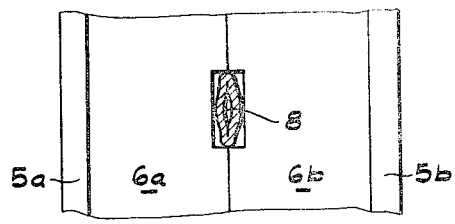
FIG. 2a is a plan view of the structure shown in FIG. 2.

In accordance with a feature of the present invention, the blow molding apparatus further comprises a clamping device which engages and deforms the parison 4 prior to blowing to thus insure that the blank 10 can be properly located with reference to the mold sections 1a, 1b prior to, during and after closing of the mold and that the surplus of plastic material can be readily separated from the finished bottle and cannot penetrate into the open end of such article. The clamping device comprises two upstanding holders 5a, 5b which are respectively secured to the mold sections 1a, 1b and respectively carry pivotable clamping elements or flaps 6a, 6b. The flaps 6a, 6b are moved toward each other (arrows A and B in FIG. 1) when the mold is in the process of being closed whereby their front edge portions engage the parison 4 and produce in the engaged parison portion a constriction which is clearly shown in FIGS. 2 and 2a. The constriction is located at a level above the top faces 7 of the mold sections 1a, 1b and is formed with a relatively small passage 8. As shown in FIG. 2a, the passage 8 is actually a narrow slit whose width is substantially less than the internal diameter of the blank 10. This blank is obtained on severing of the parison 4 by means of a suitable knife 9 (FIG. 2) or an analogous severing device. FIG. 2 further shows that the diameter of the space defined by the jaws 3 of the mold sections 1a, 1b substantially exceeds the external diameter of the blank 10. It is clear, however, that the dimensions of the jaws 3 depend on the desired external diameter of the neck of the finished bottle and that the internal diameter of the space defined by the jaws need not substantially exceed the external diameter of the parison 4. FIG. 2 is intended to illustrate an important advantage of the flaps 6a, 6b, namely, that such flaps can properly grip and deform a parison or a blank whose external diameter is considerably smaller than the diameter of the space between the jaws 3. FIG. 2 further shows that, as a result of engagement between the flaps 6a, 6b and the parison 4 at a level above the top faces 7 of the mold sections 1a, 1b but below the cutting plane of the knife 9, the open-ended uppermost portion 11 of the blank 10 resembles an upwardly diverging funnel or chalice which permits convenient introduction of the tip 12 of a blowing mandrel 15 shown in FIGS. 3–7. The mandrel 15 is introduced at the blowing station which may but need not coincide with the station at which the extruder introduces the parison 4 between the sections 1a, 1b of the blow mold. This depends on the setup of the blowing apparatus, i.e., the mold can be moved from registry with the extruder into registry with the mandrel 15 and and vice versa, or the extruder can be moved into and away from registry with the mold. When the tip 12 of the mandrel 15 is caused to advance in the direction indicated by arrow C (FIG. 3), it effects further expansion of the funnel 11 and simultaneously pivots the flaps 6a, 6b about their respective shafts 13 so that the blank 10 expands in the region directly above the top faces 7 of the mold sections 1a, 1b and develops a bulbous intermediate portion 14 which is shown in FIG. 4. At the same time, the blank 10 expands into engagement with the internal surfaces of the jaws 3 and is thereby held against lengthwise movement with reference to the closed mold. The directions in which the flaps 6a, 6b pivot in response to downward movement of the mandrel 15 are respectively indicated by arrows D and E (FIG. 4).

The bulbous intermediate portion 14 can develop exclusively in response to deformation which results from pivoting of the flaps 6a, 6b. However, it is clear that the development of such bulbous intermediate portion can be enhanced by a gas which is introduced by way of the axial bore (not shown) in the blowing mandrel 15. This presents no problems since the blowing of gas into the blank 10 is an essential function of the mandrel 15, i.e., there is no need to provide the mandrel with a separate bore or orifice for admission of such gas which effects expansion of the blank 10 in the region between the flaps 6a, 6b and the cavity in the closed mold.

FIG. 5 shows that the mandrel 15 comprises the aforementioned tip 12 and a cutting portion 16 which resembles a sleeve and has an annular cutting edge 17 which severs the surplus 18 at the upper end of the parison 10 so that the surplus is bodily separated from the open-ended part or neck 19 of the finished bottle 21. The surplus 18 includes the material of the funnel 11 and the material of the bulbous intermediate portion 14. The lower end position of the mandrel 15 is shown in FIG. 6; the cutting edge 17 of the sleeve 16 has completed its severing action so that the neck 19 of the finished bottle 21 is formed with a smooth top end face or edge face 20. The neck 19 is properly calibrated by the jaws 3 and the tip 12, i.e., the internal surfaces of the jaws 3 determine the external configuration and the tip 12 determines the internal diameter of the neck 19. The mold is thereupon opened by moving the mold sections 1a, 1b in the directions respectively indicated by arrows B and A. The bottle 21 remains temporarily suspended on the tip 12 of the mandrel 15 and the separated surplus 18 forms a ring which surrounds the sleeve 16. The flaps 6a, 6b are biased by suitable springs (to be described in connection with FIGS. 8 and 9) so that they immediately reassume the positions shown in FIG. 1 as soon as the mold sections 1a, 1b move away from each other. The bottle 21 and the surplus 18 are thereupon stripped off the mandrel 15 in a manner which forms no part of the present invention. In their parison-engaging positions (FIGS. 1–3), the flaps 6a, 6b are located in a plane which is at least substantially parallel to the plane of the top faces 7 of the mold sections 1a, 1b.

Figure 8:
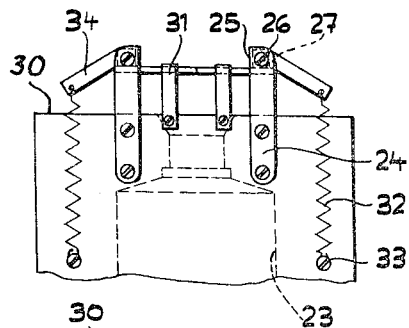
FIG. 8 is a fragmentary elevational view of a mold which forms part of a second blow molding apparatus and carries a clamping device corresponding to that shown in FIGS. 1 to 7.
Figure 9:
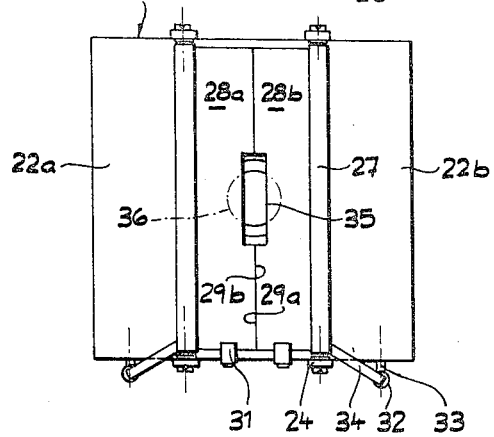
FIG. 9 is a plan view of the structure shown in FIG. 8.

FIGS. 8 and 9 illustrate in greater detail one presently preferred embodiment of the open-and-shut mold which can be used in the practice of my invention. The mold includes two sections 22a, 22b shown in closed positions in which they define a cavity 23 having the configuration of a bottle. Each mold section carries two upstanding holders 24 which can be screwed or bolted to the respective section and whose upper end portions 25 support threaded trunnions 26 provided at the ends of horizontal pintles or carriers 27 for the flaps 28a, 28b. The front edge portions 29a, 29b of the flaps 28a, 28b abut against or are closely adjacent to each other when the mold is closed and before the blowing mandrel (not shown in FIGS. 8 and 9) is caused to penetrate into the upper end portion of the blank. In their illustrated positions, the flaps 28a, 28b are located in a plane which is parallel to the plane of the top faces 30 of the mold sections 22a, 22b. The flaps then abut against suitable stops 31 under the action of helical springs 32 which engage levers 34 each of which is connected to one of the flaps. The lower end convolutions of the springs 32 are attached to retainers or posts 33 provided on the respective mold sections. The levers 34 may but need not be directly connected to the respective flaps.

As shown in FIG. 9, the edge portions 29a, 29b of the flaps 28a, 28b are provided with registering triangular or otherwise configurated cutouts or notches 35 which together define an elongated rectangular, rounded or elliptical aperture for a portion of a parison whose outline is indicated by phantom lines, as at 36. When the mold is closed, the surfaces bounding the notches 35 deform the parison to provide it with a constriction having a passage which is similar or analogous to the passage 8 shown in FIG. 2a.

The operation of the blow molding apparatus which includes the mold of FIGS. 8 and 9 is similar to that of the apparatus shown in FIGS. 1 to 7. The parison 4 is introduced between the mold sections 22a, 22b in open position of the mold and the sections are thereupon moved toward each other to assume the illustrated positions. The flaps 28a, 28b thereby deform the parison in the region of their notches 35 to form the aforementioned constriction, and the knife (not shown) performs a cutting stroke to convert the topmost portion of the resulting tubular blank into a funnel-shaped open-ended body which is ready to receive the tip of the mandrel. It is clear that the flaps 6a, 6b or 28a, 28b need not be pivoted by the mandrel; they can be pivoted by a separate mechanism which is operated in synchronism with the mandrel or independently therefrom. The blank is automatically provided with a bulbous intermediate portion when the flaps 28a, 28b leave their illustrated positions; such intermediate portion thereupon undergoes further deformation in response to penetration of the mandrel into the closed mold and is ultimately separated from the finished article as surplus in a manner as shown in FIG. 6.

Figures 10A, 10B:
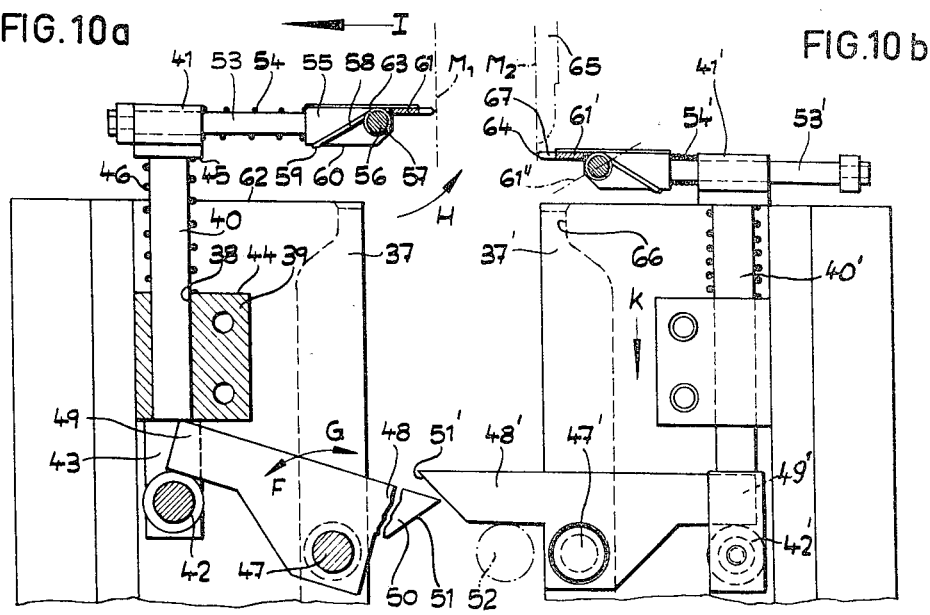
FIG. 10 (composed of FIGS. 10a and 10b) illustrates a portion of a mold which forms part of a third blow molding apparatus and wherein the clamping device serves to move blanks downwardly and away from the extruder.

If the extruder is mounted for movement in a horizontal plane into and away from registry with the blow mold, or vice versa, it is normally necessary to lower the mold prior to movement of the die of the extruder away from vertical alignment with the mold cavity. This can present serious problems, especially if the apparatus comprises a composite mold which defines two or more cavities and is therefore bulky and heavy. Such vertical movements of a conventional blow mold are necessary in order to insure that the die of the extruder can discharge a continuous parison and that the lower end of such parison is not caught in a component part of the mold subsequent to severing of a blank 10; for example, the lower end of the continuously extruded parison could come into contact with the top faces 7 or 30 of the mold sections shown in FIGS. 1–7 and 8–9. Such engagement could result in undue flexing or bending of the parison or in other damage. Depending on the direction of relative movement between the extruder and the blow mold, the lower end of the parison could also engage the flaps 6a, 6b or 28a, 28b or their holders because such parts extend upwardly and beyond the top faces of the mold sections. It is therefore another object of the present invention to provide a blow mold which is designed in such a way that the parison is not likely to be caught by parts of the mold even though the mold need not be moved up and down in order to avoid collision with the parison. A blow mold which can perform such functions is illustrated in FIG. 10 composed of FIGS. 10a and 10b. FIG. 10a shows one of the flaps 61 in parison-engaging position and FIG. 10b shows one of the flaps 61 in a different parison-engaging position 61'. The pivoted position of the right-hand flap is shown by phantom lines at 61''. In the position shown in FIG. 10a, the flap 61 is about to engage or already engages the external surface of a freshly extruded parison prior to severing of such parison to form a hollow blank. In the solid-line position 61' of FIG. 10b, the flap 61 engages a severed blank and holds it with the other flap prior to penetration of the blowing mandrel, not shown. The mounting means for the flap 61 on the left-hand mold section 37 are mirror symmetrical with reference to the mounting means on the right-hand mold section. All parts in the right-hand half of the blow mold are denoted by reference numerals corresponding to those shown in FIG. 10a but each followed by a prime. Each mold section 37 is provided with two external brackets 39 having vertical bores 38 for reciprocable plungers 40. The upper end portions of the plungers 40 carry horizontal sleeves 41 located at a level above the top faces 62 of the mold sections 37, and the lower end portions of the plungers 40 are bifurcated, as at 43, and carry roller followers 42. The bifurcated portions 43 have horizontally extending shoulders which cooperate with the adjoining brackets 39 to fix the corresponding plungers 40 in their upper end positions (FIG. 10a). Helical springs 46 are disposed between the upper sides 44 of the brackets 39 and the undersides 45 of the sleeves 41 to bias the plungers 40 upwardly and to normally maintain these plungers in the upper end positions. It is normally sufficient if only one of the two plungers 40 on each mold section 37 is biased by a spring.

Each mold section 37 further carries at least one horizontal pivot 47 for a two-armed level 48 which is oscillatable in directions indicated by arrow F–G and one arm (49) of which engages one of the roller followers 42. The other arm 50 of each lever 48 has a suitably inclined face 51 which can track a fixed cam 52 serving as a means for effecting movements of plungers 40 toward the lower end positions (see the position 40' of the plunger shown in FIG. 10b). The cam 52 is shown in the form of a horizontal rod which is affixed to a stationary member, for example, to the platen or platens which support the mold sections 37. The blow molding apparatus including the mold of FIGS. 10a, 10b may comprise a single pair of levers 48 or two pairs of such levers; it normally suffices to use a single pair, especially if the mold is not very large. It is clear that, if the blow mold comprises a single pair of levers 48 and if such levers are mounted at the same end of the mold, they must be placed into adjacent planes to avoid interference. It is presently preferred to mount one of the levers 48 at one side of one of the mold sections 37 and to mount the other lever 48 at the other side of the other mold section.

Each sleeve 41 guides a horizontal rod-like holder 53 which is biased forwardly (i.e., toward the other holder) by a helical spring 54 which reacts against the sleeve 41 and engages a block 55 for a horizontal pintle or carrier 56. A torsion spring 57 is convoluted around the pintle 56 and has one of its legs fixedly secured thereto. The other leg 58 of the spring 57 is bent over, as at 59, and engages the underside 60 of the block 55 to thus tend to turn the pintle 56 in a counterclockwise direction, as viewed in FIG. 10a (see the arrow H). The pintle 56 is rigid with (e.g., welded to) the corresponding flap 61; such flap may be a one-piece body or it may comprise several parts. When the mold is open, the planes of the flaps 61 are parallel to the plane of the top faces 62 of the mold sections 37. The flaps 61 then abut against stop plates 63 on the adjoining blocks 55. If desired, the helical springs 54 (or analogous biasing means) can be concealed in the sleeves 41, as long as they can urge the blocks 55 forwardly toward the blocks of the other section. Also, the stop plates 63 can be affixed to the flaps 61 to normally bear against the blocks 55 under the action of torsion springs 57 or analogous biasing means. It is further clear that the blow mold of FIGS. 10a, 10b (or the blow mold of FIGS. 1–7 or FIGS. 8–9) can be provided with several (e.g., two) mold cavities and that the associated extruder can be provided with an equal number of discrete dies. The flaps 61 then engage two or more parisons or blanks at a time or each of the mold sections 37 may carry a discrete flap 61 for each mold cavity. For example, if the mold shown in FIGS. 8 and 9 comprises two cavities, each of the flaps 28a, 28b can be provided with two cutouts 35.

Figure 3:
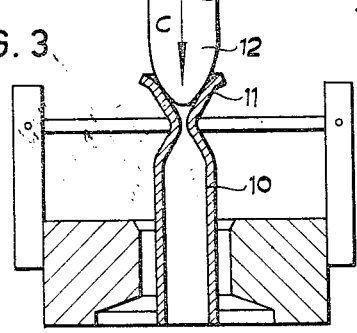
FIG. 3 illustrates the structure of FIG. 2 and a portion of a blowing mandrel which is about to enter the hollow upper end portion of the blank.
Figure 4:
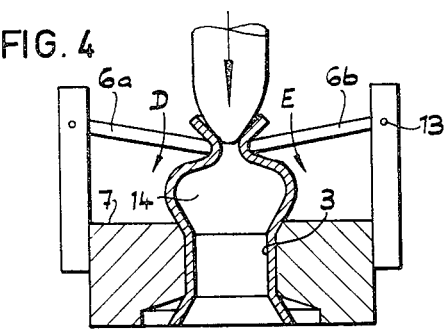
FIG. 4 illustrates the structure of FIG. 3 and shows the expanded intermediate portion of the blank at a level above the closed mold.

Referring again to FIGS. 10a and 10b, when the mold is being closed so that the sections 37 move toward each other, the flaps 61 engage one or more parisons in a manner as illustrated in FIGS. 1 to 3. The springs 54 are rather weak so that they preferably yield when the edges 64 of the flaps 61 engage the external surface of a parison whereby the rods 53 slide in the respective sleeves 41 (see the arrow I in FIG. 10a). At the same time, the inclined surfaces 51 on the arms 50 of the levers 48 engage the cam 52 and cause the corresponding plungers 40 to move downwardly whereby the flaps 61 share such movements of the plungers and lower the freshly severed blank to move it away from the lower end of the parison which is continuously extruded by the die of the extruder. It is assumed that the extruder is stationary and that the entire blow mold of FIGS. 10a, 10b is movable with reference to the extruder, either back and forth to move the mold cavity into registry with the die or with the blowing mandrel, or along an endless path.

When the mold is closed (see FIG. 10b), its central vertical symmetry plane M1 assumes the position M2. The flaps 61 (in the positions 61') still remain in a horizontal plane and the springs 54 are compressed. The edge portions 64 of the flaps 61 are located in the plane M2. During closing of the mold, the edge portions 64 of the two flaps 61 preferably abut against each other and thereupon cause the rods 53 to slide with reference to their sleeves 41 to stress the springs 54. The right-hand plunger 40 is shown in its lower end position 40' in which it is held by the arm 49 of the lever 48 (in the position 48') because the inclined face on the arm 50 of such lever engages the cam 52. Therefore, the right-hand flap 61 (in the position 61') is located at a level below the flap 61 of FIG. 10a. The arrow K indicates the direction of movement of plungers 40 toward their positions 40'. Such movement insures that the funnel-shaped upper end portion of a freshly formed blank is separated from the lower end of the parison. Also, the blank which is suspended between the edge portions 64 of the flaps 61 can "quiet down", i.e., the oscillations of its lower end decrease so that it is in a truly vertical position when the mold closes.

When the mold thereupon moves into registry with the blowing mandrel 65 (indicated in FIG. 10b by phantom lines), or vice versa, the mandrel descends in the direction indicated by arrow K and pivots the flaps 61 from the positions 61' to the positions 61''. Such pivoting takes place after the blank is already provided with a constriction and with a bulbous intermediate portion immediately below the constriction. The mandrel can admit air as soon as it reaches the funnel-shaped upper end portion of the blank so that the latter expands and moves its external surface into engagement with the jaws 66 of the closed mold. In this way, the neck of a blank is properly expanded prior to final blowing even if the external diameter of the blank is initially much less than the diameter of the space which accommodates the neck of the finished bottle. In the next step, the mandrel 65 descends to assume its lower end position and completes the formation of a bottle by admitting air or another blowing medium into the blank which is accommodated in the cavity of the closed mold and whose lower end is sealed, preferably pinched, in response to closing of the mold. The edge portions 64 of the flaps 61 are preferably provided with cutouts or notches 67 (see FIG. 10b) whose function is the same as that of the notches 35 shown in FIG. 9. Such notches insure that the constriction of the blank which is held by the flaps 61 is provided with a passage which can admit gas into the blank as soon as the tip of the mandrel enters the funnel-shaped upper end portion of the blank.

The parts 38–57 and 63 constitute mounting means for the flaps 61.

FIGS. 11 to 14 illustrate a further embodiment of a blow molding apparatus wherein the mold is provided with two cavities for simultaneous production of two bottles at a time. The extruder comprises two dies 69 (only one can be seen in each of FIGS. 11 and 12) each of which continuously extrudes a parison 68. The sections of the mold are shown at 70a and 70b, and each of these sections respectively carries a clamping element 71a, 71b which is a functional equivalent of a flap 6, 28 or 61. FIG. 11a shows that the clamping elements 71a, 71b are mirror symmetrical with reference to the central vertical symmetry plane T of the blow mold; each of these clamping elements is formed with two delta-shaped notches or cutouts 72 having deepmost portions 73 which engage the external surfaces of respective parisons 68 when the mold is closed. The width of the notches 72 increases gradually from their deepmost portions 73 toward the notches in the other clamping element. The configuration of surfaces surrounding the deepmost portions 73 corresponds to the configuration of constructions which are formed on the parisons 68 in response to closing of the mold. Each of the clamping elements 71a, 71b is mounted on one or more reciprocable rod-like holders 74 (e.g., on two parallel holders 74 as best shown in FIG. 11a), and the outer ends of such holders are affixed to crossheads 75. Each crosshead is connected with a motor, e.g., a cylinder and piston assembly 76; as shown in FIG. 11a, the piston rods 77 of the assemblies 76 are directly coupled to the respective crossheads 75. The holders 74 are reciprocable in bearing sleeves 79 mounted on platens or supports 78 which carry the respective mold sections.

The movements of the clamping elements 71a, 71b are regulated in such a way that they assume their operative positions (FIG. 12) on or even prior to closing of the blow mold. The element 71a then overlaps the element 71b and both clamping elements engage the parisons 68 at a level above the top faces 80 of the mold sections 70a, 70b. The edge portion 81 of the clamping element 71a is bent upwardly (see FIG. 11) to insure that the two clamping elements can bypass each other during closing of the mold.

The apparatus of FIGS. 11 to 14 comprises a three stage blowing and calibrating mandrel which is shown in FIG. 14 and whose lower end portion or tip 82 has a diameter less than the internal diameter of a parison 68. The tip 82 is separated from a cylindrical median portion 84 of the mandrel by a conical intermediate or spreading portion 83. The diameter of the median portion 84 corresponds to the internal diameter of the neck of a finished bottle, i.e., the diameter of the portion 84 equals the diameter of the jaws 85 of the mold sections 70a, 70b minus twice the wall thickness of the neck of a bottle. The third or uppermost portion 87 of the mandrel is the cutting portion and performs the function of the sleeve 16 shown in FIGS. 5 to 7. The numeral 86 denotes the cavity of the mold.

In operation, the tip 82 of the mandrel enters the upper end portion of a freshly obtained tubular blank while the blank is held by the clamping elements 71a, 71b. The mandrel then admits a gas which begins to expand the blank and escapes along the external surface of the descending mandrel. The gas expands that portion of the blank which is located in the notches 72 of the clamping elements whereby such portion of the blank enters the deepmost portions 73 of such notches. The escape of gas from the interior of the blank along the external surface of the mandrel is throttled in response to further descent of the mandrel whereby the blank expands in the region immediately below the clamping elements 71a, 71b. When the elements 71a, 71b are thereupon withdrawn in directions indicated by arrows L and M (FIG. 14), the blanks are properly engaged by the jaws 85 of the mold sections 70a, 70b and the mandrel descends still further to complete the calibration of the neck 88 and separation of the surplus. Each finished bottle 89 has an outer surface which follows the internal surface of the respective cavity 86.

The admission of air during the initial stage of penetration of the mandrel into the blank is not essential, i.e., the clamping elements 71a, 71b can properly hold a blank during introduction of the mandrel even if the jaws 85 of the mold sections are designed to form with the mandrel a bottle 89 with a neck 88 of relatively large diameter and even if the diameter of a blank is substantially less than the diameter of the space defined by the jaws 85.

In some instances, it is desirable to provide the clamping elements 71a, 71b with notches 72 whose deepmost portions 73 are very narrow so that the clamping elements practically close the passages in the constrictions of the blanks in response to closing of the mold. The lowermost portion or tip 82 of each mandrel then constitutes a needle which penetrates into the constriction and defines therein a passage for convenient introduction of the median portion 84 which cooperates with the jaws 85 to calibrate the neck 88 of the bottle 89. Such penetration of the median portion 84 is facilitated by the fact that the upper end portion of the blank forms a funnel after the blank is severed from the parison 68. It is equally possible to provide the conical intermediate portion 83 of the mandrel with a ring-shaped cutting edge which removes material from the blank and thus provides in the blank a passage for entry of the median portion 84. Such ring-shaped cutting edge removes material subsequent to introduction of some gas which suffices to expand the blank into engagement with the jaws 85.

In blow molding apparatus wherein the extruder is movable into and away from registry with the cavity of a blow mold, particularly when the extruder is moved in a plane which is the symmetry plane of the open mold, the lower end of the parison is likely to sway back and forth or "tremble" so that it cannot be moved into accurate alignment with the pinching edges in the lower portions of the mold sections. With reference to FIGS. 11 to 14, this would mean that the extruder including the dies 69 would move at right angles to the plane of FIG. 11 or 12, i.e., in the plane T of FIG. 11a. Swaying or trembling of the parisons also develops when the extruder is moved along an endless path into registry with the cavities of two or more blow molds which are adjacent to such endless path. The swaying develops under the action of centrifugal force as well as a result of intermittent stoppages of the extruder when it registers with successive molds. Improper alignment of parisons with the mold cavities could result in the production of defective bottles, especially in the production of bottles wherein the wall thickness would vary in the circumferential direction of their lower ends.

In order to avoid swaying, trembling or similar periodically recurring movements of the parisons, the apparatus of FIGS. 11 to 14 is provided with a stabilizing device 90. This device comprises horizontal shafts 91 mounted on the mold section 70a and supporting arcuate arms 92 for a stabilizing member 93 of sheet metal or the like. The member 93 is formed with depressions or sockets 94 (see FIG. 13) which can accommodate portions of parisons 68 during closing of the mold. The member 93 normally assumes the operative position shown in FIGS. 11 and 12 in which it extends into the space between the lowermost portions of the mold sections 70a, 70b and into the path of swaying movement of the lower end portions of the parisons 68. When such parisons are engaged by the clamping elements 71a, 71b, their lower end portions engage the stabilizing member 73 so that they are compelled to remain in upright positions and can be properly engaged by the pinching edges 99 of the mold sections when the mold is closed (see FIG. 14). The member 93 not only stabilizes the parisons 68 (i.e., it causes the lower ends of parisons to cease their oscillatory or similar movements) but its sockets 94 also center the parisons with reference to the corresponding mold cavities 86 to insure an optimum positioning of blanks during closing of the mold.

Figure 11:
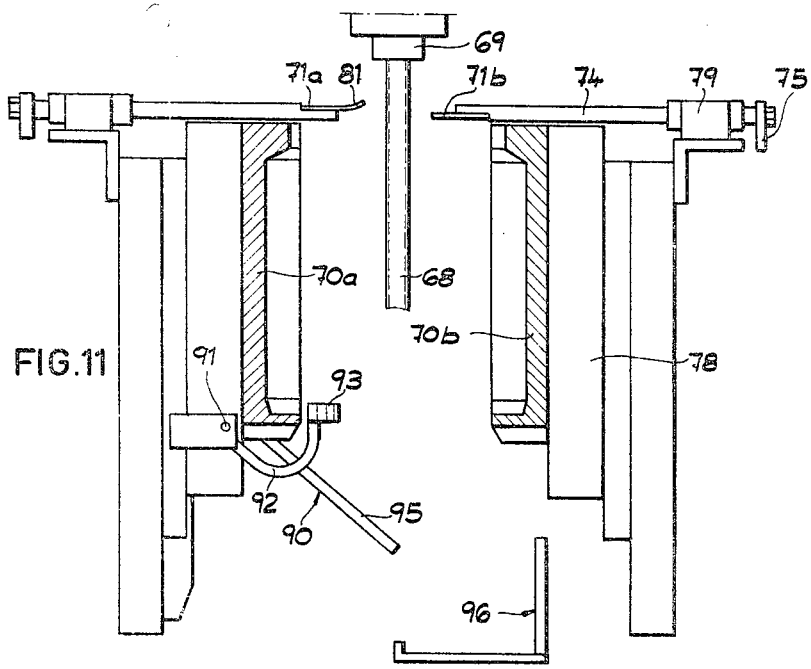
FIG. 11 is a fragmentary side elevational view of a fourth blow molding apparatus with the mold shown in section and in open position.
Figure 11A:
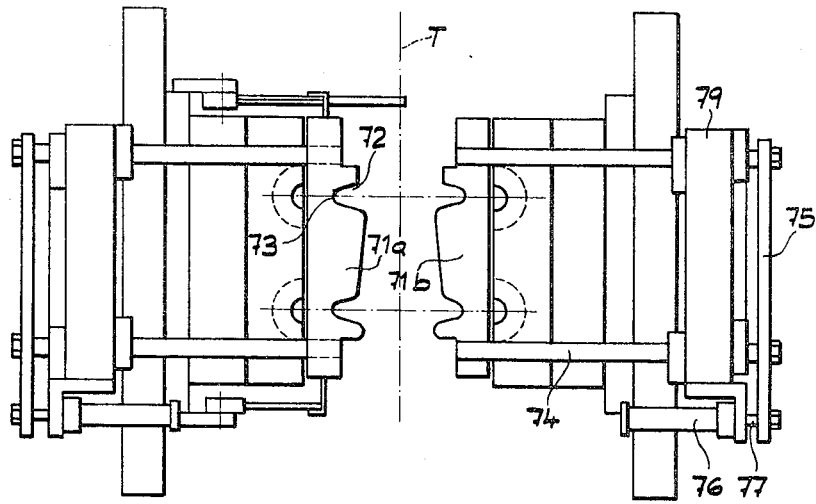
FIG. 11a is a plan view of the structure shown in FIG. 11.

The stabilizing device 90 further comprises a motion transmitting lever 95 and an actuating member 96 which is movable with the mold section 70b and serves to move the stabilizing member 93 between the operative position of FIG. 11 or 12 and the inoperative position of FIG. 14 in which the stabilizing member is out of the way and permits unimpeded closing of the mold. The actuating member 96 is a profiled body having an upstanding portion 97 which engages the lower end of the lever 95 during closing of the mold to pivot the stabilizing member in a counterclockwise direction, as viewed in FIG. 12, and a relatively short upstanding portion 98 which engages the lower end of the lever 95 during opening of the mold and thereby moves the stabilizing member 93 back to the operative position shown in FIGS. 11 and 12. The actuating member 96 can be moved with the mold section 70b or independently of such mold section, as long as it can move the stabilizing member 93 out of the way prior to complete closing of the mold and as long as it returns the member 93 to operative position when the mold is open. The stabilizing device 90 may further include one or more springs which can bias the stabilizing member 93 to either of its end positions so that the actuating member 96 merely serves to move the member 93 over its dead-center position.

If desired, the stabilizing device 90 can perform an entirely different function or an additional important function. For example, if the manufacturer desires to produce bottles wherein the wall thickness varies in accordance with a predetermined pattern, the position of sockets 94 in the stabilizing member 93 is selected in such a way that the sockets hold the lower end portions of parisons 68 away from accurate vertical alignment with the corresponding cavities 86 of the mold. In this way, the seams which are formed by the pinching edges 99 of the mold sections 70a, 70b are not located in the central vertical planes of the blanks and the variations in wall thickness of finished bottles 89 are thereby selected in dependency on the extent of lateral displacement of the lower parison ends by the sockets 94 of the stabilizing member 93. Variations in wall thickness of bottles 89 are often desirable if the lower portion of the bottle is to be provided with a nipple, nozzle, connector, mouthpiece or the like and if such configuration is to be obtained in a wall portion whose thickness exceeds the thickness of the remaining parts of the wall. Also, the manufacturer may wish to intentionally reduce the wall thickness of a selected portion of the blank in order to provide the finished article with a weakened part in the form of a bubble or the like which can be destroyed in response to a rise in pressure of entrapped material to a given value. All this can be achieved by forming the stabilizing member 93 with sockets 94 which are not in exact alignment with the symmetry planes 100 (FIG. 13) of the respective mold cavities.

It is clear that the movements of the stabilizing member 93 to and from its operative position must be performed very rapidly because the intervals allotted for the production of hollow plastic articles in a modern blow molding machine are extremely short. Also, the movements of stabilizing member 93 must be synchronized with movements of the mold sections 70a, 70b to insure that the member 93 is withdrawn from the space between the mold sections without interfering with movements of the mold sections but after the completion of stabilization of the lower ends of the parisons 68. It is further clear that the stabilizing device 90 (or an equivalent or similar stabilizing device) can be used with equal advantage in the apparatus which utilize the blow molds shown in FIGS. 1-7, 8-9 or 10a-10.

The blow molding apparatus of my invention can be used with particular advantage in the production of bottles with relatively wide necks and when it is impractical, undesirable or impossible to employ extruders wherein the die or dies discharge air or another gaseous medium which serves for preliminary expansion of blanks to prevent undue shifting of blanks with reference to the mold and/or blowing mandrel. For example, the provision of separate conduits for discharge of air through the die or dies of an extruder often results in undue complicatedness of the extruder, especially if the extruder must be moved with reference to the mold. Also, if the extruder or the mold is moved continuously, there is no time left for admission of air by way of the dies because the interval during which the extruder registers with a mold is extremely short. Still further, when the apparatus is designed for the production of bottles with wide necks which are obtained on blow molding of relatively thin (small-diameter) parisons, preliminary expansion of parisons with air which is discharged by the die or dies is insufficient to insure proper positioning and retention of the blank with reference to the mold.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. A method of blow molding bottles or similar hollow articles of the type having an open-ended part of predetermined internal and external dimensions, comprising the steps of extruding through an extruder thermoplastic material in the form of a hollow parison having an end into the space between the sections of an open mold spaced from the extruder; closing the mold to clamp the end of the parison between the mold sections and clamping the parison at a point between the extruder and the mold to form in the parison a constriction external of the mold; severing the parison at a point between the constriction and the extruder to separate from the parison a hollow blank with a hollow end portion located at one side of said constriction; moving the extruder and the closed mold with the blank relative to each other to move the mold with the blank out of the path of thermoplastic material extruded by the extruder; radially expanding the blank against the closed mold to form in a portion of the blank between the constriction and that portion of the mold which accommodates the open end of the finished article a bulbous enlargement and to expand an intermediate portion of said blank in said portion of the mold into engagement with said mold portion; mechanically calibrating said intermediate portion of said blank; and converting the blank into an article by blowing a gas through said hollow end portion and said constriction so that the remainder of the blank expands in the closed mold.

2. A method as defined in claim 1, further comprising the step of terminating the clamping action prior to said converting step.

3. A method as defined in claim 1, wherein said expanding step includes blowing a gas into the blank.

4. A method as defined in claim 1, wherein the thermoplastic material is extruded downwardly so that said end is the lower end of the parison and wherein said clamping step comprises deforming the parison radially inwardly to provide said constriction with a narrow passage at a level above the mold, said severing step comprising imparting to said hollow end portion the shape of a funnel which diverges upwardly and away from said constriction.

5. A method as defined in claim 1, wherein said converting step comprises severing said hollow end portion and part of said expanded intermediate portion from the remainder of the blank.

6. A method as defined in claim 1, wherein said expanding step comprises admitting into the blank a gas by way of said hollow end portion and said constriction whereby the thus admitted gas effects radial expansion of the blank against that portion of the mold which accommodates the open-ended part of the finished article and limited radial expansion of said constriction.

7. A method as defined in claim 1, wherein said calibrating step comprises inserting a calibrated blow mandrel into the free end of said blank and moving said blow mandrel into said portion of the mold.

8. A method as defined in claim 1, wherein said expanding step comprises moving the constriction toward said portion of the mold which accommodates the open-ended part of the finished article.

* * * * *